(12) United States Patent
Lee

(10) Patent No.: US 7,615,303 B2
(45) Date of Patent: Nov. 10, 2009

(54) DIRECT METHANOL FUEL CELL AND PORTABLE COMPUTER HAVING THE SAME

(75) Inventor: Seung-jae Lee, Seongnam-si (KR)

(73) Assignee: Samsung SDI Co., Ltd., Suwon (KR)

(*) Notice: Subject to any disclaimer, the term of this patent is extended or adjusted under 35 U.S.C. 154(b) by 671 days.

(21) Appl. No.: 10/957,588

(22) Filed: Oct. 5, 2004

(65) Prior Publication Data
US 2005/0089743 A1   Apr. 28, 2005

(30) Foreign Application Priority Data
Oct. 22, 2003  (KR) .................. 10-2003-0073831

(51) Int. Cl.
H01M 8/02 (2006.01)
H01M 8/04 (2006.01)
H01M 8/10 (2006.01)
G06F 1/16 (2006.01)
G06F 1/18 (2006.01)

(52) U.S. Cl. .............. 429/34; 429/12; 361/679.21; 361/679.55

(58) Field of Classification Search .................. 429/12, 429/19, 34; 361/683, 679.55, 679.21; 713/300
See application file for complete search history.

(56) References Cited

U.S. PATENT DOCUMENTS

| 6,689,502 B2* | 2/2004 | Choi ........................... 429/32 |
| 6,756,145 B2* | 6/2004 | Narayanan et al. ............ 429/32 |
| 6,994,932 B2* | 2/2006 | Kinkelaar et al. ............. 429/34 |
| 2002/0076599 A1* | 6/2002 | Neutzler et al. ............... 429/38 |
| 2003/0157389 A1* | 8/2003 | Kornmayer .................. 429/34 |
| 2004/0053100 A1* | 3/2004 | Stanley et al. ................ 429/30 |
| 2004/0136156 A1* | 7/2004 | Nakamura et al. ........... 361/683 |

FOREIGN PATENT DOCUMENTS

| JP | 05-041221 | 2/1993 |
| JP | 08-130023 | 5/1996 |
| JP | 2002-049440 | 2/2002 |
| JP | 2003-132931 | 5/2003 |
| JP | 2003-203647 | 7/2003 |
| WO | 02-093675 | 11/2002 |
| WO | 03-061047 | 7/2003 |
| WO | 03-071627 | 8/2003 |

OTHER PUBLICATIONS

Fuel Cell Handbook—5th ed. U.S. Dept. of Energy, Oct. 2000, p. 1-1.*

* cited by examiner

Primary Examiner—Gregg Cantelmo
(74) Attorney, Agent, or Firm—H.C. Park & Associates, PLC

(57) ABSTRACT

The invention is directed to a direct methanol fuel cell (DMFC) and a portable computer having the same. The portable computer includes a display unit rotatably coupled to a main unit. The display unit includes a display panel, a liquid fuel tank, and a direct methanol fuel cell (DMFC) on the backside of the display panel. The main unit comprises a keyboard, and a liquid supply device under the keyboard to circulate an output from the DMFC to the fuel tank. The portable computer has a thin monopolar type DMFC on the backside of the display panel, which provides a longer operating time, and also improves portability by supplying an energy source promptly.

10 Claims, 6 Drawing Sheets

DIRECT METHANOL FUEL CELL AND PORTABLE COMPUTER HAVING THE SAME

CROSS-REFERENCE TO RELATED APPLICATIONS

This application claims priority of Korean Patent Application No. 2003-73831 filed on Oct. 22, 2003 in the Korean Intellectual Property Office, the disclosure of which is incorporated herein by reference.

BACKGROUND OF THE INVENTION

1. Field of the Invention

The present invention relates to a thin, monopolar-type, direct methanol fuel cell and a portable computer having the same.

2. Description of the Related Art

A direct methanol fuel cell (DMFC) has been developed as a replacement for a secondary battery used to power a laptop computer or other computerized and/or electrical/digital device. The DMFC is a clean energy source designed to replace fossil energy, and has a high energy density and a high energy conversion rate. Since the DMFC is operable at an ambient temperature, and can be miniaturized and sealed, it has been proposed for use in various fields, such as pollution free automobiles, home generators, a mobile communication systems, medical equipment, military equipment, and space equipment.

The DMFC produces electricity through an electrochemical reaction between methanol and oxygen. As depicted in FIG. 1 a unit cell of the DMFC, i.e., a fuel cell, comprises an anode 2 and a cathode 3, and a hydrogen ion exchange membrane arranged between them. The anode 2, the cathode 3, and the hydrogen ion exchange membrane 1 constitute a Membrane Electrode Assembly (MEA). The hydrogen ion exchange membrane 1 is formed of a polymer electrolyte having a thickness in a range of 50~200 μm. The anode 2 and cathode 3 comprise supporting layers for supply and diffusion of fuel, and have catalyst layers for oxidation/reduction reaction of the fuel and oxygen.

The supporting layers of the anode 2 and the cathode 3 are formed of carbon paper or carbon fiber, and are wet-proofed for easy fuel supply and easy dissipation of reaction products.

At the anode 2, supplied fuel such as methanol, ethanol, or isopropyl alcohol reacts with water producing hydrogen ions, electrons, and carbon dioxide (oxidation reaction). The produced hydrogen ions flow to the cathode 3 through the hydrogen ion exchange membrane 1. At the cathode 3, hydrogen ions react with oxygen to produce water (reduction reaction).

Each reaction can be described as follows,

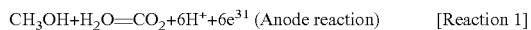

$CH_3OH+H_2O=CO_2+6H^++6e^{31}$ (Anode reaction)  [Reaction 1]

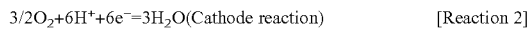

$3/2O_2+6H^++6e^-=3H_2O$ (Cathode reaction)  [Reaction 2]

$CH_3OH+3/2O_2=2H_2O+CO_2$ (Overall reaction)  [Reaction 3]

A theoretical voltage of approximately 1.2 V can be generated by a unit cell of a DMFC. However, an open circuit voltage at an ambient temperature and at atmospheric pressure falls below 1 V due to a voltage drop caused by an active overpotential and a resistance overpotential. In reality, an actual operating voltage lies in the range of 0.4~0.6 V. Therefore, to obtain higher voltages, a plurality of unit cells connected in series is required.

Typically, a bipolar stacking method is adapted for connecting the unit cells in series. However, this method increases the thickness of a portable computer due to the thick thickness of the fuel cell stack. Therefore, when a portable computer adapts a DMFC, the DMFC can be separated from the portable computer, and connected by a docking method as disclosed in Japanese Publication No. 2002-32154. The docking system requires pumps for supplying fuel from a fuel tank to the DMFC.

In order to be able to build in a thin portable computer, the DMFC should be thin. For this purpose, In one embodiment the DMFC of the present invention has a thin configuration which uses a monopolar plate.

SUMMARY OF THE INVENTION

The present invention provides a monopolar type thin direct methanol fuel cell (DMFC).

The present invention also provides a liquid fuel tank supplying uniform fuel without using an external operating device.

The present invention further provides a portable computer having the DMFC.

According to an aspect of the present invention, there is provided a DMFC having an ion exchange membrane, a plurality of anodes on a face of the ion exchange membrane, and a plurality of cathodes on an opposite side of the ion exchange membrane corresponding to the anodes. In one embodiment, current collectors are placed on each of the anodes and the cathodes, respectively; and connecting wires electrically connect the anodes and the cathodes in series to form a direct circuit. Additionally, fuel supply plates are disposed on each of the anodes and the cathodes, respectively.

According to another aspect of the present invention, there is provided a portable computer having a display unit rotatably coupled to a main unit, wherein the display unit comprises a display panel, a liquid fuel tank, and a direct methanol fuel cell (DMFC) on the backside of the display panel, and the main unit comprises a keyboard. A liquid supply device under the keyboard circulates an output from the DMFC to the fuel tank.

In one embodiment, a fuel channel is formed in each unit cell region corresponding to each of the anodes and the cathodes at the fuel supply plate.

In another embodiment, an inlet and an outlet of the fuel channel are formed at each unit cell region. The inlets of the fuel channel are connected through an fuel inflow channel; the outlets of the fuel channel are connected through a fuel outflow channel; and the fuel supply plate includes an inlet of the fuel supply plate connected to a front end of the fuel inflow channel and an outlet of the fuel supply plate connected to a rear end of the fuel outflow channel.

In one embodiment, the fuel inflow channel and the fuel outflow channel are formed not to interfere with each other.

A wicking member with a predetermined length can be disposed at an inlet of the fuel channel at a side of the anode.

In one embodiment, a fuel supply pipe is interposed between the fuel tank and the inlet of the fuel supply plate at a side of the anode.

In one embodiment, the main unit further includes an air compressor to supply air to the inlet of the fuel supply plate at a side of the cathode.

The liquid supply device comprises a water pump for circulating water produced at the cathode through the outlet of the fuel supply plate to the fuel tank.

In one embodiment, unreacted methanol at the anode is supplied to an inlet of the water pump.

In one embodiment, the main unit further includes an air separator for discharging unreacted air to atmosphere interposing between the cathode and the water pump.

DETAILED DESCRIPTION OF THE INVENTION

Hereinafter, a portable computer in accordance with embodiments of the present invention will be described more fully with reference to the accompanying drawings.

Figure 1:
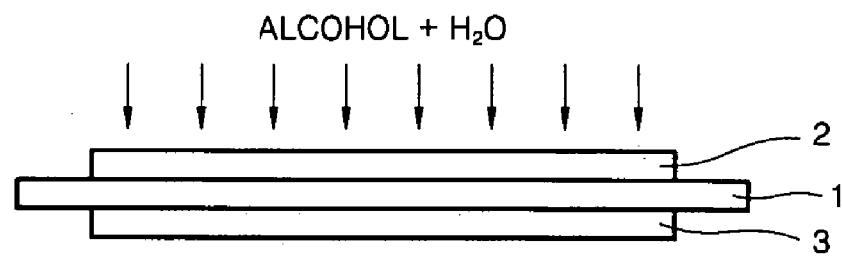
FIG. 1 is a schematic diagram of a typical configuration of a DMFC.
Figure 2:
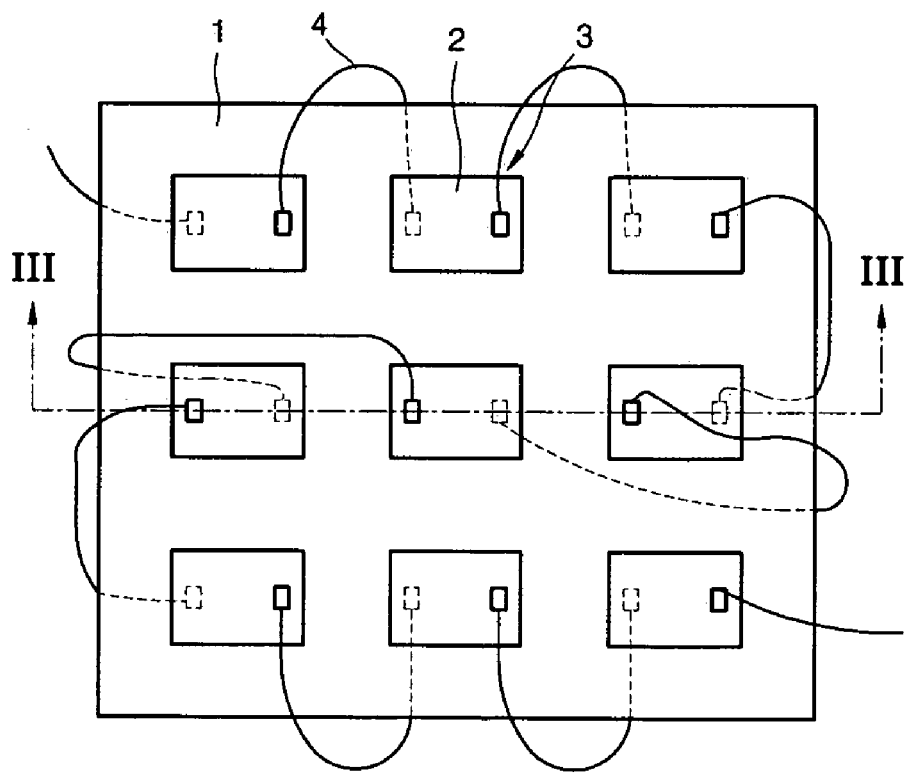
FIG. 2 is a plan view of a monopolar type fuel cell applied to a portable computer, according to the present invention.
Figure 3:
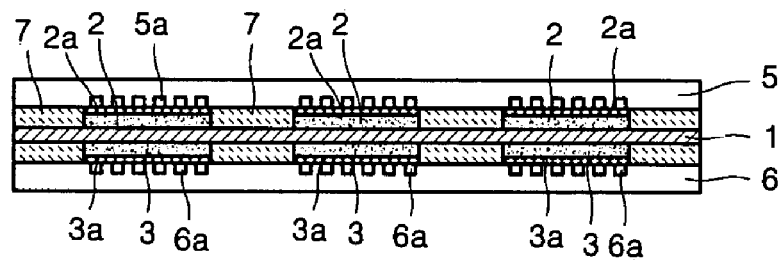
FIG. 3 is a cross-sectional view taken along the line III-III in FIG. 2.

FIG. 2 is a plan view of a monopolar type fuel cell, of which fuel supply plates at the bottom portion and at the top portion of the fuel cell are removed. The monopoloar type fuel cell is applied to the portable computer according to the present invention. FIG. 3 is a cross-sectional view taken along the line III-III in FIG. 2. The same reference numerals are used to the same elements FIG. 1 through FIG. 3.

Referring to FIGS. 2 and 3, anodes 2 are disposed on a side of a hydrogen ion exchange membrane 1, and cathodes 3 are disposed on an opposite side of the hydrogen ion exchange membrane 1 corresponding to the anodes 2. On each of the electrodes 2 and 3, a current collector 2a and 3a is formed.

In one embodiment, the current collectors 2a and 3a are made of a metal mesh coated with a material having electrical conductivity such as, but not limited to, gold.

The current collectors 2a and 3a are connected by wires 4 to form a direct circuit as depicted in FIG. 2. Fuel supply plates 5 and 6 made of a non-conductive material are placed on the current collectors 2a and 3a. Fuel channels 5a and 6a for supplying fuel (methanol or air) to each electrode 2 and 3 are formed on each fuel supply plate 5 and 6. Gaskets 7 as sealing members are formed between the electrodes.

Figure 4:
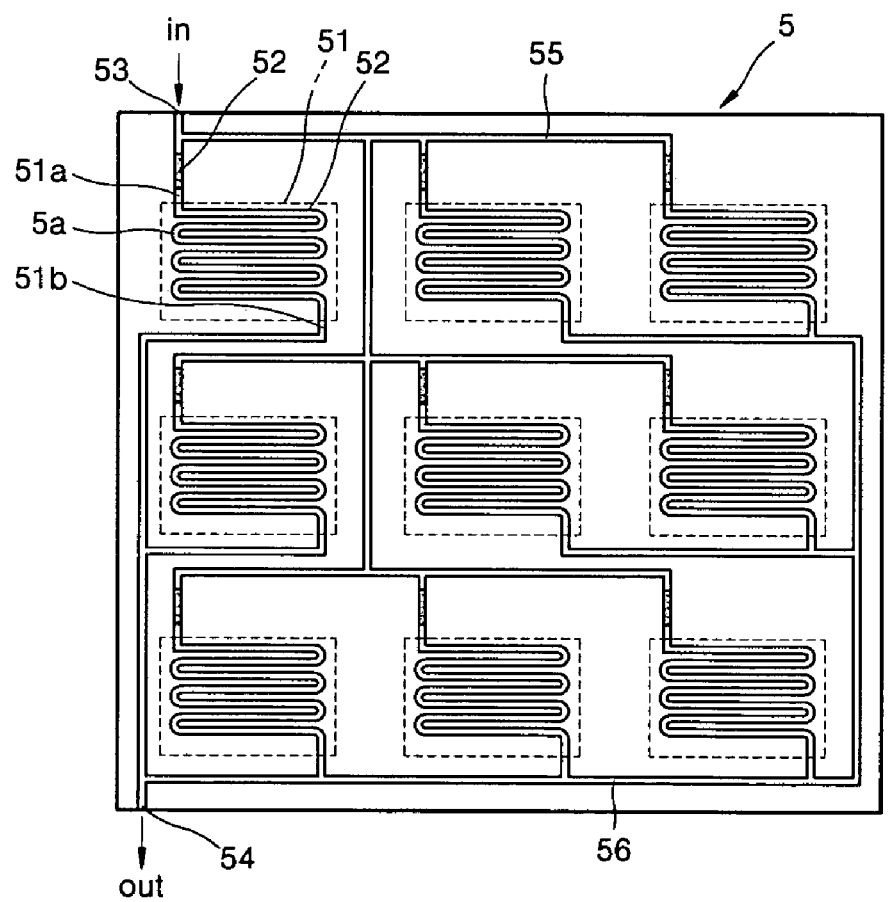
FIG. 4 is a plan view of an inner face of a fuel supply plate.

FIG. 4 is a plan view of an inner face of a fuel supply plate 5 placed on the anodes 2.

Referring to FIG. 4, a serpentine shape fuel channel 5a is formed on a region 51 corresponding to each unit cell. The fuel channels 5a on each unit cell region 51 have a fuel inlet 51a and a fuel outlet 51b. The fuel inlets 51a of each fuel flow channel 5a are connected to a fuel inflow channel 55, and the outlets 51b of each fuel flow channel are connected to a fuel outflow channel 56. All fuel inlets 51a of the unit cell region 51 are linked to the fuel inlet 53 of the fuel supply plate 5 by the fuel inflow channel 55. All fuel outlets 51b of the unit cell region 51 are linked to the fuel outlet 54 of the fuel supply plate by the fuel outflow channel 56. The fuel inflow channel 55 and the fuel outflow channel 56 are formed not to interfere to each other. In one embodiment, a wicking member 52 such as a porous sponge with a predetermined length is placed in each inlet 51a of the unit cell region 51. The wicking member 52 helps steady fuel supply to the anode 2.

A sealing member, such as gasket 7 in FIG. 3 or the like, can be applied to the region other than the fuel flow channels of the fuel supply plate 5 and 6.

The fuel supply plate 6 placing on the cathodes 3 have almost the same configuration as the fuel supply plate depicted in FIG. 4 except that there is no wicking member at the inlet of the unit cell region.

Figure 5:
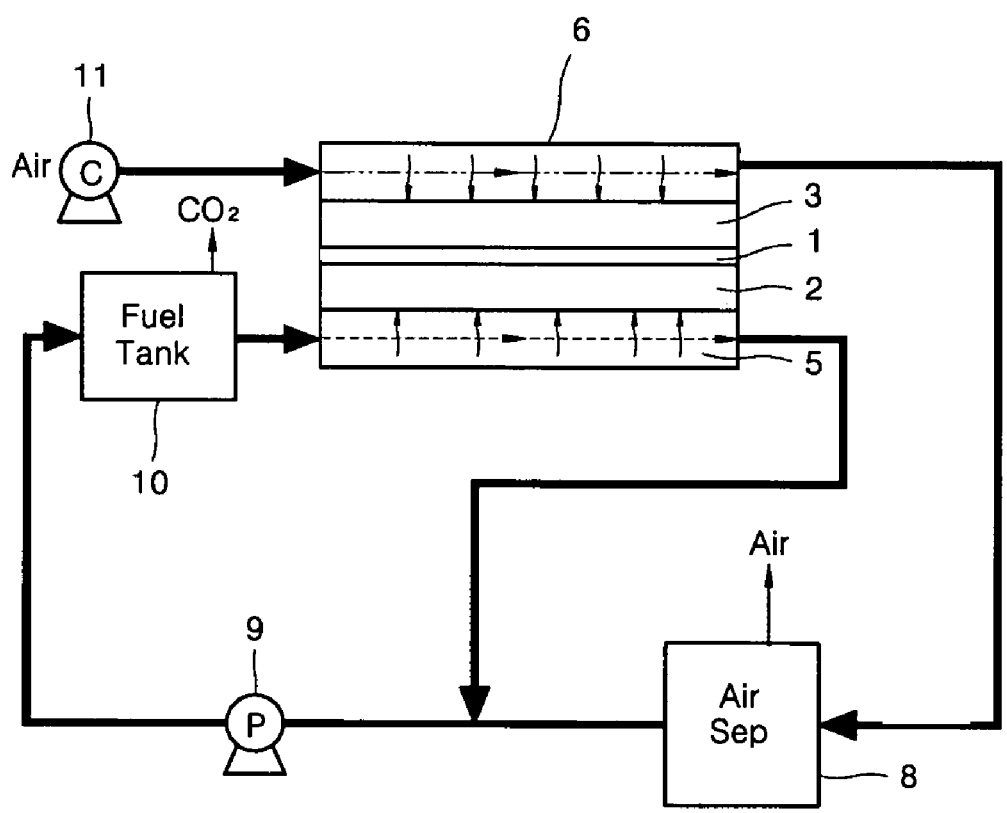
FIG. 5 shows a basic configuration of a fuel cell system according to the present invention.

FIG. 5 shows a basic configuration of a fuel cell system according to the present invention.

Referring to FIGS. 4 and 5, methanol from a fuel tank 10 is fed into the inlet 51a of each unit cell region 51 through the inlet 53 of the fuel supply plate 5. At this time, the fuel is supplied steadily to the anode 2 of each unit cell by the wicking member 52 formed at the inlet 51a of the unit cell. The supply of liquid fuel from the fuel tank 10 to the inlet 53 of the fuel supply plate 5 in this case may be performed by gravitational force through a fuel supply conduit (not shown) when the fuel tank 10 is placed on the fuel cell, while air supplied to the cathode 3 is pumped by a compressor 11.

Unreacted surplus methanol at the anode 2 and carbon dioxide ($CO_2$) generated at the anode 2 are pumped to an upper space of the fuel tank 10 by a water pump 9. The carbon dioxide pumped into the fuel tank 10 is discharged to atmosphere through a hole formed (not shown) at a top of the fuel tank 10, and the unreacted methanol is mixed with unused methanol in the fuel tank 10.

Excess air and produced water from the cathode 3 are pumped to an air separator 8 by the water pump 9. Then, the air is discharged into atmosphere through a hole (not shown) at a top of the air separator 8 and the water is stored in the separator 8 after impacting a wall of the air separator 8. The water stored in the air separator 8 and the unreacted methanol from the anode 2, are pumped to the fuel tank 10 by the water pump 9.

Figure 6:
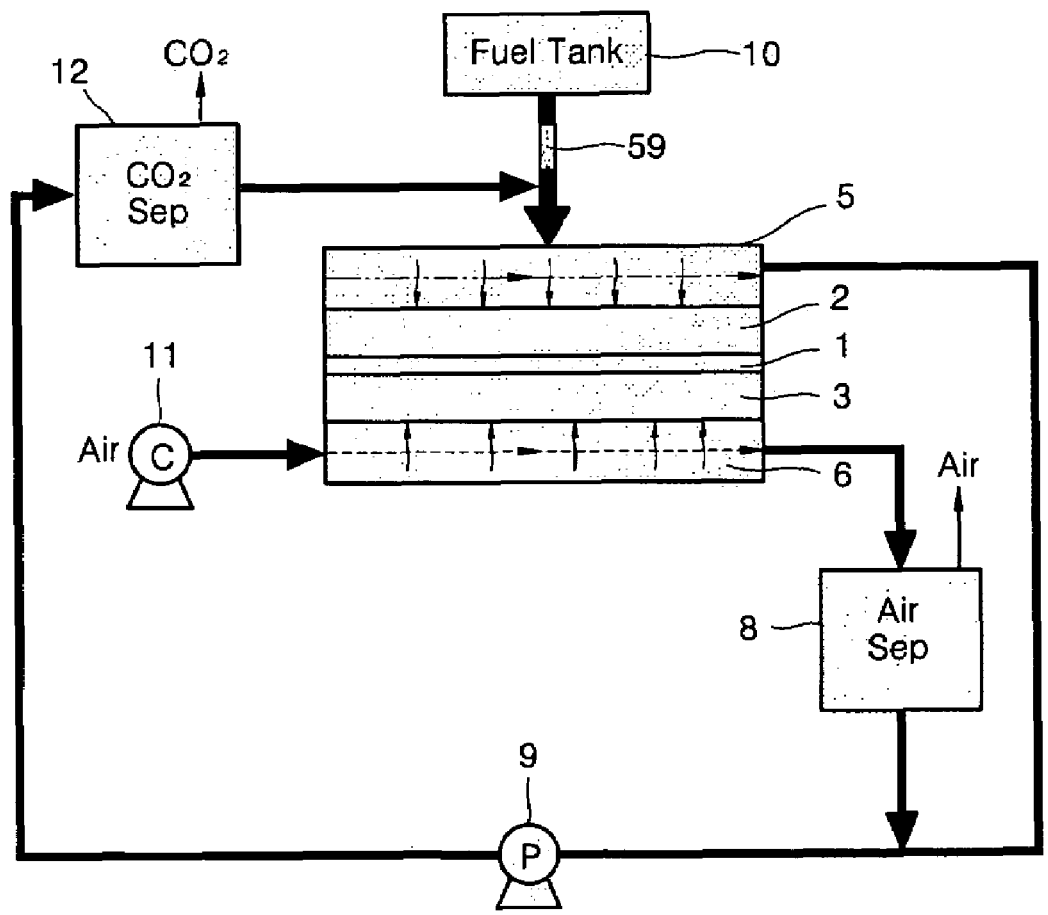
FIG. 6 shows a configuration of a fuel cell system according to another embodiment of the present invention.

FIG. 6 shows a configuration of a fuel cell system according to another embodiment of the present invention. The same reference numerals are used to the elements identical with those depicted in FIG. 5 and detailed descriptions thereof will be omitted.

Referring to FIGS. 4 and 6, methanol from the fuel tank 10 is fed into the inlet 51a of the unit cell region 51 through the inlet 53 of the fuel supply plate 5 after passing through the wicking member 59. The wicking member 59 helps a steady fuel supply to the inlet 53 of the fuel supply plate 5. At this time, fuel supply from the fuel tank 10 to the inlet 53 of the fuel supply plate 5 is performed by gravitational force through a fuel supply conduit 22 in FIG. 7 because the fuel tank 10 is positioned above the fuel cell, while air supplied to the cathode 3 is pumped by an air compressor 11. In one embodiment, pure methanol is stored in the fuel tank 10.

Air that has passed through the cathode 3 and produced water is pumped to an air separator 8 by the water pump 9. Then, the air is discharged into the atmosphere through a (not shown) at the top of the air separator 8 and the water is stored in the separator 8 after impacting a wall of the air separator 8. The water stored in the air separator 8 is pumped to a carbon dioxide ($CO_2$) separator 12 by the water pump 9. Most of the pure methanol supplied from the fuel tank 10 is consumed at the anode 2, and produces carbon dioxide ($CO_2$) at the anode 2. The carbon dioxide is pumped to the carbon dioxide ($CO_2$) separator 12 by the water pump 9.

The carbon dioxide ($CO_2$) conveyed to the carbon dioxide ($CO_2$) separator 12 is discharged into the atmosphere through a hole (not shown) formed on the carbon dioxide ($CO_2$) separator 12, and water from the carbon dioxide separator 12 is supplied to the anode 2 with the methanol supplied from the fuel tank 10 passing through the wicking member 59.

The above configuration of DMFC may use pure methanol as fuel, thereby increasing the fuel density.

Figure 7:
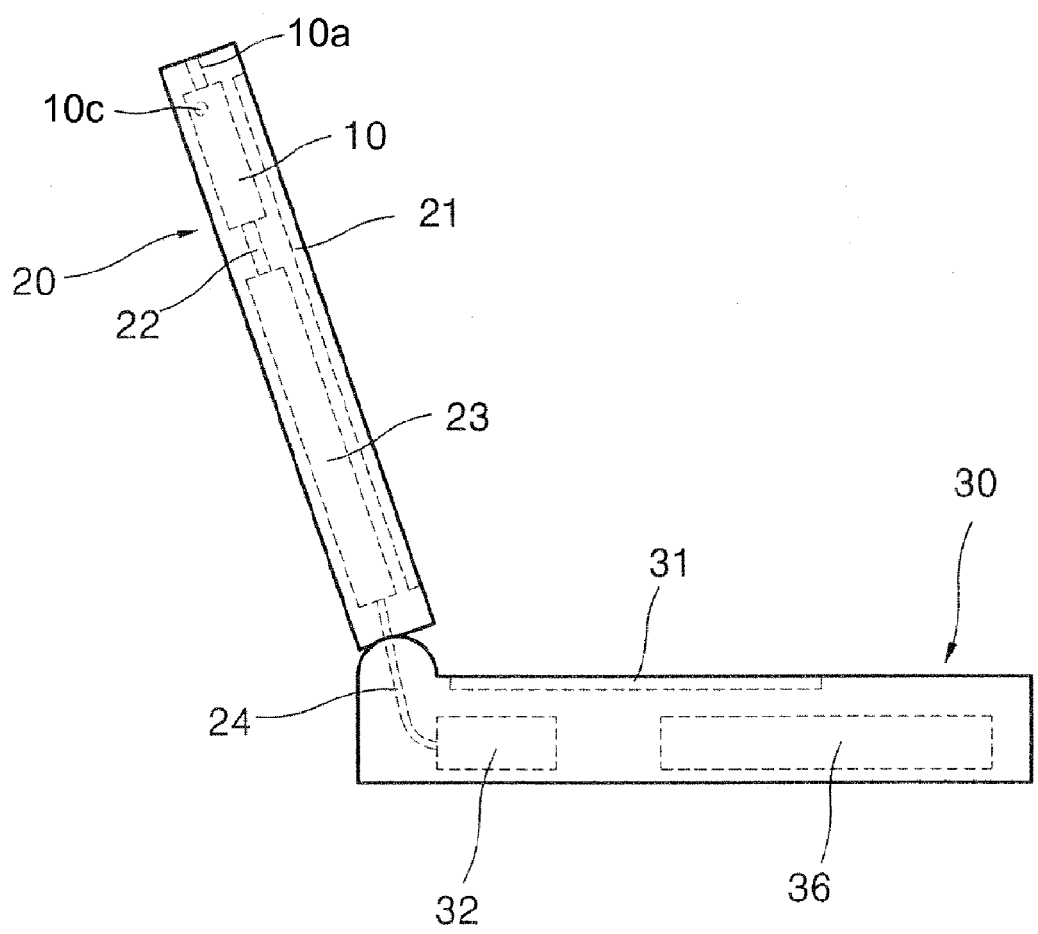
FIG. 7 is a schematic drawing of a portable computer according to an embodiment of the present invention.
Figure 8:
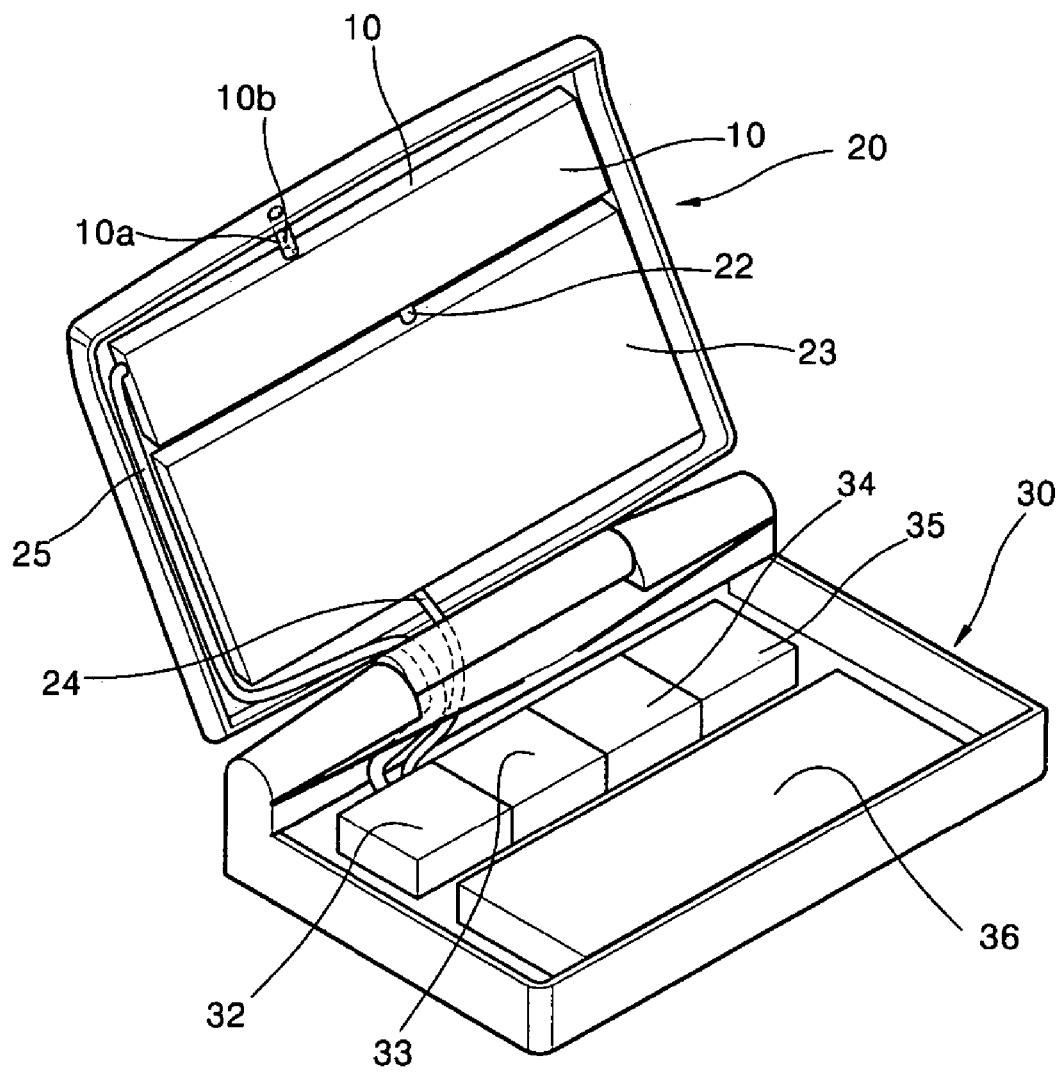
FIG. 8 is a perspective view showing a configuration of a DMFC built in the portable computer of FIG. 7.

FIG. 7 is a schematic drawing of a portable computer according to an embodiment of the present invention, and FIG. 8 is a perspective view showing a DMFC configuration built in the portable computer of FIG. 7.

Referring to FIGS. 7 and 8, the portable computer comprises a display unit 20 and a main unit 30. These units 20 and 30 are rotatably coupled each other so that when the computer is in use, the display unit 20 is rotated upward to open from the main unit 30, and when the computer is not in use, the display unit 20 is rotated downward to cover the main unit 30.

A display panel 21 is formed on the front surface of the display unit 20, and a fuel tank 10 for methanol and a DMFC 23 are mounted on the backside of the display panel 21.

An exhaust hole 10a is formed at a top of the fuel tank 10, and a permeable film 10b is placed in the exhaust hole 10a. In one embodiment, the permeable film 10b allows a gas to pass but does not allow liquid such as water or methanol to pass.

The DMFC 23 of the portable computer comprises a pair of fuel supply plates 5 and 6 in FIG. 3, covering a plurality of unit cells. A fuel supply pipe 22 is disposed from the fuel tank 10 to the fuel inlet (53 in FIG. 4) of the fuel supply plate 5 at a side of anode 2.

A keyboard 31 is mounted on the surface of the main unit 30, and a water pump 32 for circulating unreacted methanol discharged from the anodes 2 of the DMFC 23 to the fuel tank 10 is disposed under the key board 31. The water pump 32 is connected to a fuel discharge pipe 24 which is disposed at the outlet 54 in FIG. 4 of the fuel supply plate 5. Reference numeral 10c refers to an inlet hole for the unreacted methanol pumped by the water pump 32 to enter the fuel tank 10. Reference numeral 25 refers to a fuel circulating pipe for supplying the unreacted methanol from the water pump 32 to the fuel tank 10. The fuel supplied to the fuel tank 10 through the fuel circulating pipe contains carbon dioxide ($CO_2$). The carbon dioxide ($CO_2$) is discharged into the atmosphere through the exhaust hole 10a formed at a top of the fuel tank 10.

A compressor 33 for supplying air to the inlet of the fuel supplying plate 6 at a side of cathode 3 is disposed in the main unit 30.

Reference numeral 34 denotes a converter for converting a DC voltage of the DMFC to a required DC voltage. The output voltage from the direct current converter 34 is used for operating the display unit 20, a hard disc drive, and peripheral devices, etc.

Reference numeral 35 denotes a control unit for controlling the water pump 32, air compressor 33, and the direct current voltage converter 34.

Reference numeral 36 denotes a space for mounting memory devices such as a hard drive and a disc drive.

A portable computer according to the present invention provides a longer operating time by placing a thin monopolar type DMFC on the backside of the display panel, and also provides an improved portability by supplying energy promptly. The portable computer according to the present invention also has advantages that it does not require an additional fuel supply pump because fuel from fuel tank to fuel cell is supplied by gravitational force. Additionally, the fuel can have a higher fuel density since the system uses pure liquid methanol.

Although not shown, embodiments of the DMFC of the above-described invention may be implemented in other computerized and/or electrical/digital devices, including, but not limited to, mobile phones, flat panel displays, radios, satellites, DVD players, CD players, GPS units, sonar units, radar units, robots, home appliances, personal data assistants (PDA's), lighting devices, musical instruments such as keyboards, and so forth.

While the present invention has been particularly shown and described with reference to exemplary embodiments thereof, it should not be construed as being limited to the embodiments set forth herein. Various modifications to the embodiments described can be made by those of skill in the art without departing from the scope of the present invention. Accordingly, the true scope of the present invention is determined not by the above description, but by the appended claims and their equivalents.

What is claimed is:

1. A portable computer, comprising:
a display unit rotatably coupled to a main unit, wherein the display unit comprises a display panel and the main unit comprises a keyboard;
a liquid fuel tank;
a direct methanol fuel cell (DMFC) located within an interior portion of a backside of the display panel; and
a liquid supply device positioned under the keyboard and connected to both the liquid fuel tank and to the DMFC to circulate an output from the DMFC to the fuel tank,
wherein the DMFC comprises:
an ion exchange membrane;
a plurality of anodes on a face of the ion exchange membrane, and a plurality of cathodes corresponding to the anodes and positioned on the opposite side of the ion exchange membrane;
current collectors placed on each of the anodes and the cathodes, respectively;
connecting wires electrically connecting the anodes and the cathodes in series; and
reactant supply plates disposed on each of the anodes and the cathodes, respectively,
wherein a reactant channel is formed in each unit cell region corresponding to each of the anodes and the cathodes at the reactant supply plates,
wherein an inlet and an outlet of the reactant channel are formed at each unit cell region, wherein the inlets of the reactant channel are connected through a reactant inflow channel, and the outlets of the reactant channel are connected through a reactant outflow channel,
wherein each of the reactant supply plates have an inlet of the reactant supply plate connected to a front end of the reactant inflow channel and an outlet of the reactant supply plate connected to a rear end of the reactant outflow channel,
wherein a wicking member with a predetermined length is disposed at an inlet of the reactant channel at a side of the anode, and
wherein the liquid fuel tank is placed adjacent to the DMFC.

2. The portable computer of claim 1, wherein the reactant inflow channel and the reactant outflow channel are formed not to interfere with each other.

3. The portable computer of claim 1, further comprising a fuel supply pipe interposed between the fuel tank and the inlet of the reactant supply plate at a side of the anode.

4. The portable computer of claim 1, wherein the main unit further comprises an air compressor to supply air to the inlet of the reactant supply plate at a side of the cathode.

5. The portable computer of claim 1, wherein the liquid supply device comprises a water pump for circulating water produced at the cathode through the outlet of the reactant supply plate to the fuel tank.

6. The portable computer of claim 5, wherein unreacted methanol at the anode is supplied to the water pump.

7. The portable computer of claim 5, wherein the main unit further comprises an air separator interposed between the cathode and the water pump for discharging unreacted air to an exterior atmosphere.

8. The portable computer of claim 1, wherein the liquid fuel tank is located within an interior portion of a backside of the display panel.

9. A Direct Methanol Fuel Cell (DMFC) comprising:
an ion exchange membrane;
a plurality of anodes on a face of the ion exchange membrane and a plurality of cathodes on an opposite face of the ion exchange membrane corresponding to the anodes;
current collectors placed on each of the anodes and the cathodes, respectively;
connecting wires electrically connecting the anodes to the cathodes in series to form a direct circuit; and
reactant supply plates disposed on each of the anodes and the cathodes, respectively,
wherein a reactant channel is formed in each unit cell region corresponding to each of the anodes and the cathodes at the reactant supply plate,
wherein an inlet and an outlet of the reactant channel are formed at each unit cell region, wherein the inlets of the reactant channel are connected through a reactant inflow channel, and the outlets of the reactant channel are connected through a reactant outflow channel,
wherein the reactant supply plate comprises an inlet of the reactant supply plate connected to a front end of the reactant inflow channel and an outlet of the reactant supply plate connected to a rear end of the reactant outflow channel,
wherein a wicking member with a predetermined length is disposed at an inlet of the reactant channel at a side of the anode, and
wherein a liquid fuel tank is placed adjacent to the DMFC.

10. The DMFC of claim 9, wherein the reactant inflow channel and the reactant outflow channel are formed not to interfere with each other.

* * * * *

UNITED STATES PATENT AND TRADEMARK OFFICE
CERTIFICATE OF CORRECTION

| | |
|---|---|
| PATENT NO. | : 7,615,303 B2 |
| APPLICATION NO. | : 10/957588 |
| DATED | : November 10, 2009 |
| INVENTOR(S) | : Seung-jae Lee |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 948 days.

Signed and Sealed this

Nineteenth Day of October, 2010

David J. Kappos
*Director of the United States Patent and Trademark Office*